United States Patent [19]

Davis

[11] 4,236,745
[45] Dec. 2, 1980

[54] RETRACTABLE STREAMLINING DEVICE FOR VEHICLES

[76] Inventor: Grover M. Davis, 502 Second Ave., Audubon, Iowa 50025

[21] Appl. No.: 7,439

[22] Filed: Jan. 29, 1979

[51] Int. Cl.³ .............................................. B62D 23/00
[52] U.S. Cl. .................................... 296/1 S; 105/2 A
[58] Field of Search .................. 296/1 S, 91; 105/2 R, 105/2 A

[56] References Cited

U.S. PATENT DOCUMENTS

| | | | |
|---|---|---|---|
| 2,569,983 | 10/1951 | Favre | 296/1 S |
| 2,737,411 | 3/1956 | Potter | 296/1 S |
| 3,425,740 | 2/1969 | De Vaughn | 296/1 S |
| 4,006,932 | 2/1977 | McDonald | 296/1 S |
| 4,116,482 | 9/1978 | Spiegel | 296/1 S |
| 4,142,755 | 3/1979 | Keedy | 296/1 S |

*Primary Examiner*—John J. Love
*Assistant Examiner*—John A. Carroll
*Attorney, Agent, or Firm*—Henderson & Sturm

[57] ABSTRACT

The instant invention relates generally to a truck body streamlining device, and more specifically to a collapsible, pivoted rear door attachment which when deployed in its operative position forms a reduced air drag surface on the rear of the truck body to minimize the wind resistance of the vortex which normally forms at the rear of a square backed truck.

7 Claims, 9 Drawing Figures

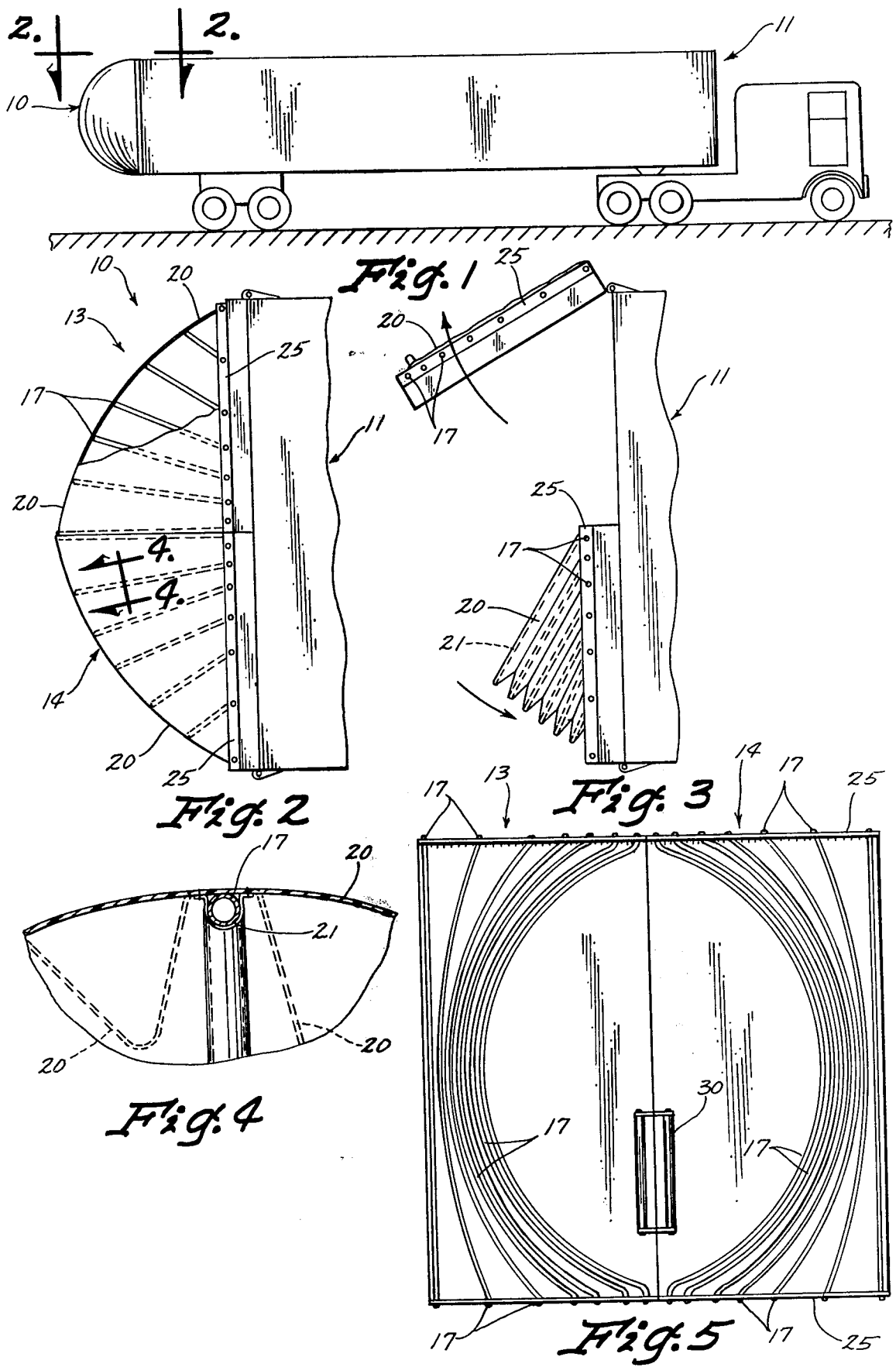

RETRACTABLE STREAMLINING DEVICE FOR VEHICLES

SUMMARY OF THE INVENTION

An object of the present invention is to provide a device which will reduce wind drag on the rear surface of a vehicle body and thereby improve gas mileage.

Another object is to provide a collapsible, light weight, covered, air foil framework which reduces the air resistance of a moving vehicle.

A further object of the invention is to provide a segmented air foil structure, which, in its retracted position, allows easy access to the vehicle rear door handles.

Still another object is to provide an air foil structure which is easily mounted on individual vehicle rear doors to produce smooth rounded cooperatively engaged air foil surfaces when in its deployed position and which collapses in a relatively flat configuration against the respective doors in the retracted position.

A still further object is the provision of a fabric covered collapsible ribbed air foil construction which will not interfere with the loading of cargo into the vehicle body and whose added weight, which reduces fuel economy, is more than offset by the increase in fuel economy achieved by deployment of the device to reduce the wind resistance of the moving vehicle body.

These and other objects, advantages, and novel features of the present invention will become apparent from the following detailed description of the invention when considered in conjunction with the accompanying drawings.

BRIEF DESCRIPTION OF THE DRAWINGS

FIG. 1 is a side view of the streamling device of the instant invention mounted on the rear of a typical truck body;

FIG. 2 is a partial top view of the streamling device of the instant invention deployed in its fully open position;

FIG. 3 is a partial top view showing the partially and fully retracted positions of the respective halves of the streamlining device of the instant invention;

FIG. 4 is a cross-sectional view of the fabric and ribbed support of the streamling device taken through line 4—4 of FIG. 2;

FIG. 5 is an end view of the ribbed support structure in the collapsed state without the fabric covering;

DESCRIPTION OF THE PREFERRED EMBODIMENT

Figure 6:
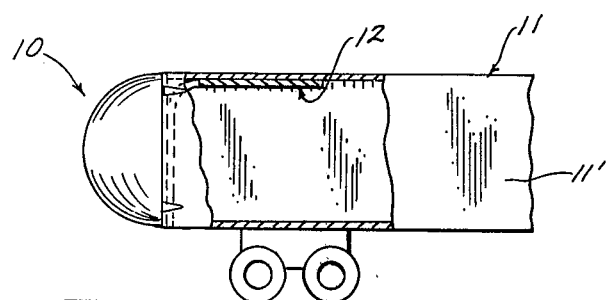
FIG. 6 is a partial cross-sectional side view of a modified version of the streamlining device used in conjunction with a truck body having an overhead type rear door.

Referring now to the drawings wherein like reference numerals designate identical or corresponding parts throughout the several views, FIG. 1 shows the truck body streamlining device 10 of the instant invention mounted on the rear of a standard truck body. It will be appreciated by anyone with a basic knowledge of physics or dynamics that an unmodified square backed vehicle creates a growing vortex of turbulent air at its trailing edge as it increases its speed in the forward direction. This vortex of turbulent air creates a drag force which is exerted on the rear surface of the vehicle. This phenomena reduces the fuel economy of the engine which is dividing its output between normal propulsion forces and the force necessary to overcome the drag forces imposed on the rear of the vehicle. By streamlining the rear surface of the truck, these drag forces are minimized and the fuel economy is increased by 5-15%.

Several examples of attempts by others to produce an effective air foil device or streamlining structure may be found in United States Patent Nos. 4,006,932; 2,737,411; 3,425,740 and 2,569,983.

As can be seen by reference to FIGS. 2 & 5, the streamlining device of the instant invention comprises two complimentary arcuate elements 13 & 14 mounted on the external surfaces of the rear doors of a standard truck. The two arcuate elements, 13 & 14, when engaged together in their operative position assume a semispherical configuration. Obviously the spherical shape may be circular or oblong depending on the dimensions of the rear of the truck or vehicle.

Each of the arcuate elements 13 & 14 comprises a plurality of rib members 17 which are covered by a fabric 20. The rib members 17 are tubular in construction, and the adjacent ribs are progressively curved from the outside of the truck body towards the center of the truck (FIG. 5). The ribs 17 are pivotably mounted in a rigid frame member 25, which is secured to the rear truck doors. The ribs 17 are configured to assume a nested relationship (FIGS. 3 & 5) when the air foil elements 13 & 14 are in their stored position. When the air foil elements are not in use, they fold flat against the truck doors, providing easy access to the rear door handles 30 or a door mounted spare tire (not shown).

Referring now to FIG. 4, it can be seen that the rib members 17 are covered by a lightweight, flexible, durable fabric 20, which may be fabricated from "Cover Lite" manufactured by Reeves or a nylon reinforced material such as NEOPRENE/HYPALON or any other suitable material having similar characteristics. As can be seen by the dashed lines in FIG. 4, the fabric 20 is designed to fold between the rib members 17 in the collapsed position. The hollow tubular rib members 17 are secured within sleeve members 21 in the fabric 20, and the rib members 17 may be fabricated from rigid plastic or thin walled metal tubing. The main considerations in choosing the material that the rib members 17, fabric 20 and frame members 25 are formed from are lightness and durability. These characteristics are critical since the addition of this streamlining device is not intended to cause the operator of the truck to sacrifice payload, and the employment of this structure is intended to more than pay for any added weight contributed to the truck body by its installation thereon.

The frame members 25 are mounted by suitable securing means on the top and bottom of the respective truck doors. The frame members 25 protrude only a short distance horizontally beyond the rear of the truck, and each of the arcuate elements 13 & 14 is designed to foldably collapse flush against the rear door surface in the stored position. When the arcuate elements 13 & 14 are deployed to form the air foil surface, each element is pivoted to the position depicted in FIG. 2 wherein the fabric 20 is stretched taut over the rib members 17. The arcuate elements 13 & 14 are then releasably secured together by hooks, straps, clamps or other suitable securing means. The arcuate elements 13 & 14 then form a smooth continuous air foil surface on the rear of the truck body, which virtually eliminates the vortex normally formed behind a square backed truck, and substantially reduces the wind drag exerted thereon, thereby increasing engine efficiency and gas mileage.

In the modified version depicted in FIGS. 6–9, the same structural elements as those in the embodiment illustrated in FIGS. 1–5 are designated by like numerals. The modified version is intended for use with a truck body 11 which employs a single overhead door 12 as opposed to the more common double door design.

In the embodiment shown in FIGS. 6 thru 9, the arcuate elements 13 and 14 are pivotally mounted on the sides 11' of the truck body 11. Each arcuate section (13,14) has a pair of pivoted hinge elements 30 to which are attached rib support members (26 or 27). As shown in FIGS. 6 thru 9, the hinge elements 30 are separate from the rib support members 26 but rigidly secured thereto and the support members 26 have a plurality of apertures suitably disposed on a horizontal surface to pivotally support the individual ribs 17.

Figure 9:
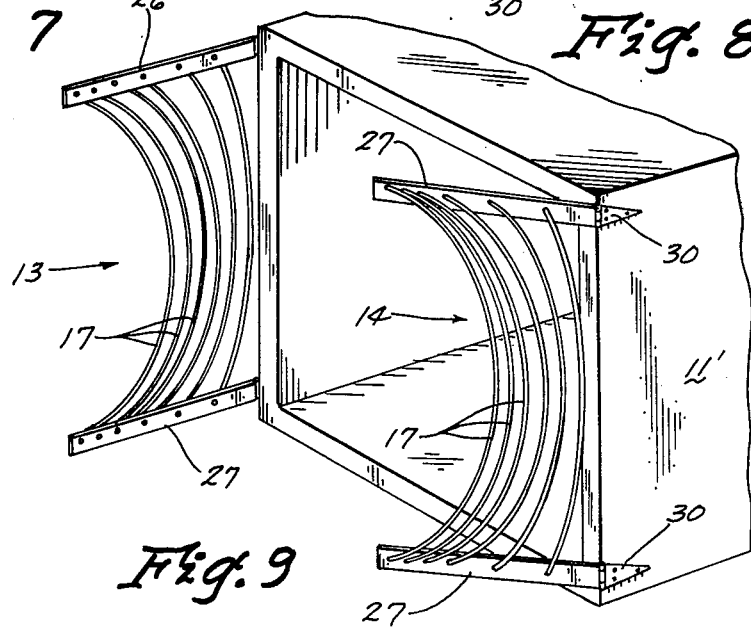
FIG. 9 is a perspective view of another modified streamlining device showing the uncovered ribbed supporting structure in the collapsed state.

As shown in FIG. 9, the support members 27 are merely an extension of the hinge elements 30 and have a plurality of apertures disposed in a vertical surface to pivotally support the individual ribs 17.

Figures 7, 8:
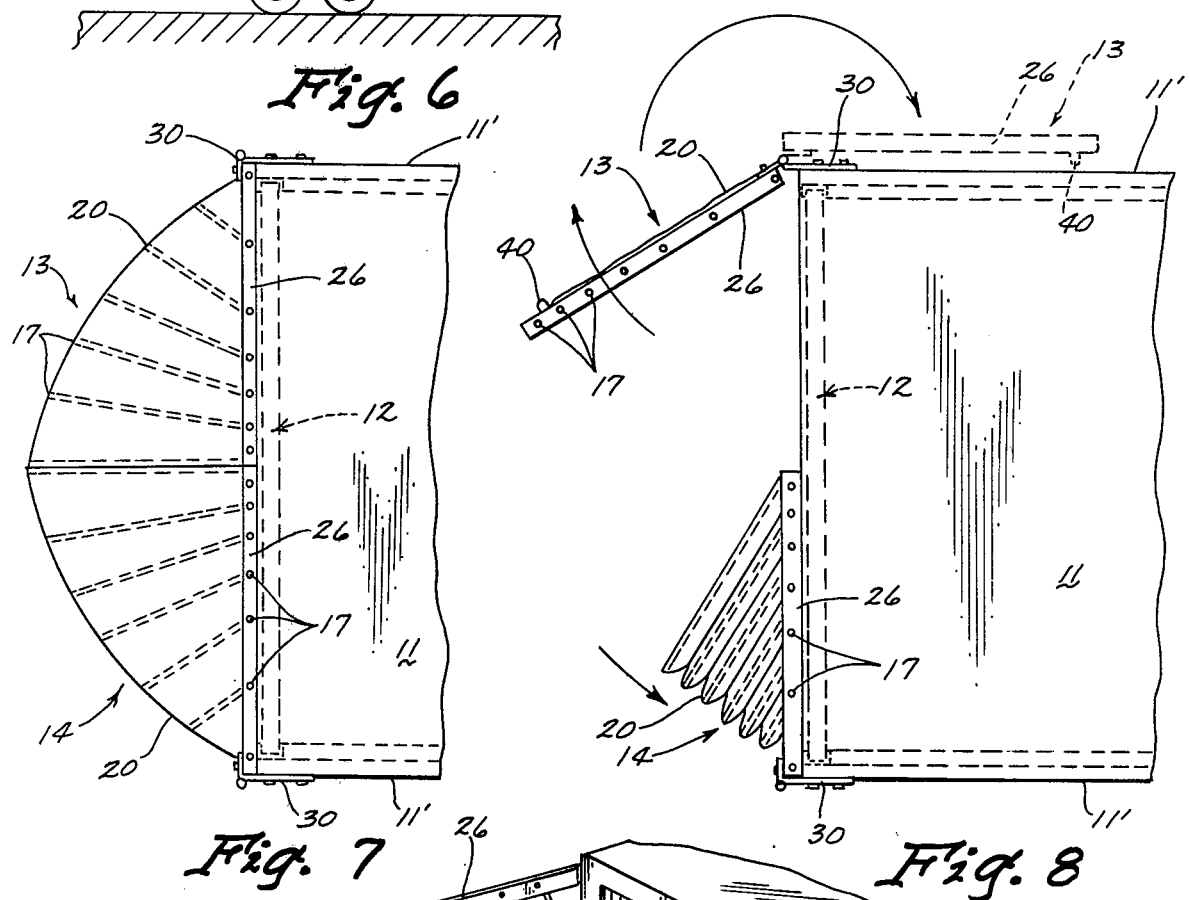
FIG. 7 is a partial top view of the modified streamlining device deployed in its fully open position.
FIG. 8 is a partial top view showing the fully and partially retracted positions of the respective halves of the modified streamlining device.

In both versions, the arcuate sections 13, 14 are intended to pivot 270° as shown in FIG. 8. The purpose for this arc is to allow the arcuate sections 13, 14 to be folded along the sides 11' of the truck. When cargo is being transferred while maintaining substantially the same truck body profile whether the device is installed or not. To this end an element 40 may be provided on each of the rib support members (26 or 27) which can function as a stop member or securing member which contacts the sides 11' of the truck.

Obviously many modifications and variations of the present invention are possible in light of the above disclosure. It is therefore to be understood that, within the scope of the appended claims, the invention may be practised otherwise than as specifically described.

I claim:

1. A streamlining apparatus for trucks or the like comprising:
   a first member adapted to be operatively pivotally attached to a top rear portion of a truck body along a first axis;
   a second member adapted to be operatively pivotally attached to a lower rear portion of a truck body along said first axis, said first and second members being pivotable between a first position parallel to the forward direction of a truck and a second position transverse to the forward direction of a truck;
   a first arcuate element;
   means for pivotally attaching said first arcuate element along a second axis to said first and second members whereby said first arcuate element is pivotable between a first position wherein the first arcuate element lies generally in a first plane containing said first and second axes and a second position wherein said first arcuate member is disposed substantially at a right angle with respect to said first plane;
   a first flexible sheet adapted for attachment to a rear side of a truck body, said first flexible sheet being connected to said first arcuate element whereby said first flexible sheet can be selectively moved to cover a portion of the rear of a truck body for streamlining purposes;
   a third member adapted to be operatively pivotally attached to a top rear portion of a truck body along a third axis;
   a fourth member adapted to be operatively pivotally attached to a lower rear portion of a truck body along said third axis, said third and fourth members being pivotable between a first position parallel to the forward direction of a truck and a second position transverse to the forward direction of a truck;
   a second arcuate element;
   means for pivotally attaching said second arcuate element along a fourth axis to said third and fourth members whereby said second arcuate element is pivotable between a first position wherein the second arcuate element lies generally in a second plane containing said third and fourth axes and a second position wherein said second arcuate element is disposed substantially at a right angle with respect to said second plane, said first and second arcuate elements being in juxtaposition when in their respective second positions and the first and second members are in the respective second positions thereof; and
   a second flexible sheet adapted for attachment to a rear side of a truck body, said second flexible sheet being connected to said second arcuate element whereby said second flexible sheet can be selectively moved to cover another portion of the rear of a truck body for streamlining purposes.

2. The streamlining apparatus of claim 1 including a third arcuate element pivotally attached to said first and second members and attached to said first flexible sheet for providing support for said flexible sheet, said third arcuate element being smaller than said first arcuate element.

3. The streamlining apparatus of claim 2 including a fourth arcuate element pivotally attached to said third and fourth members and attached to said second flexible sheet for providing support for said flexible sheet, said fourth arcuate element being smaller than said second arcuate element.

4. The streamlining apparatus of claim 3 including a fifth arcuate element pivotally attached to said first and second members and attached to said first flexible sheet for providing support for said flexible sheet, said fifth arcuate element being smaller than said third arcuate element.

5. The streamlining apparatus of claim 4 including a sixth arcuate element pivotally attached to said third and fourth members and attached to said second flexible sheet for providing support for said flexible sheet, said sixth arcuate element being smaller than said fourth arcuate element.

6. The streamlining apparatus of claim 5 including a plurality of further arcuate elements pivotally attached to said first and second members and to said first flexible sheet for supporting said first flexible sheet.

7. The streamlining apparatus of claim 6 including a plurality of further arcuate elements pivotally attached to said third and fourth members and to said second flexible sheet for supporting said second flexible sheet.

* * * * *